(12) United States Patent
Boehmann et al.

(10) Patent No.: US 12,019,649 B2
(45) Date of Patent: *Jun. 25, 2024

(54) CLOUD HYBRID APPLICATION STORAGE MANAGEMENT (CHASM) SYSTEM

(71) Applicant: SCRIPPS NETWORKS INTERACTIVE, INC., Knoxville, TN (US)

(72) Inventors: Brant Boehmann, Knoxville, TN (US); Alex Garrison, Knoxville, TN (US); Wade Chandler, Knoxville, TN (US); Sean Considine, Knoxville, TN (US); Ramesh Mendu, Knoxville, TN (US)

(73) Assignee: SCRIPPS NETWORKS INTERACTIVE, INC., Knoxville, TN (US)

( * ) Notice: Subject to any disclaimer, the term of this patent is extended or adjusted under 35 U.S.C. 154(b) by 5 days.

This patent is subject to a terminal disclaimer.

(21) Appl. No.: 18/150,433

(22) Filed: Jan. 5, 2023

(65) Prior Publication Data

US 2023/0161788 A1    May 25, 2023

Related U.S. Application Data

(63) Continuation of application No. 16/771,002, filed as application No. PCT/US2018/066395 on Dec. 19, 2018, now Pat. No. 11,550,811.

(Continued)

(51) Int. Cl.
*G06F 16/25*    (2019.01)
*G06F 16/11*    (2019.01)
(Continued)

(52) U.S. Cl.
CPC .......... *G06F 16/256* (2019.01); *G06F 16/113* (2019.01); *G06F 16/164* (2019.01); *G06F 16/2322* (2019.01); *G06F 16/288* (2019.01)

(58) Field of Classification Search
CPC .. G06F 16/256; G06F 16/164; G06F 16/2322; G06F 16/288; G06F 16/113
See application file for complete search history.

(56) References Cited

U.S. PATENT DOCUMENTS 8,347,088 B2 * 1/2013 Moore .................... G16Z 99/00
                                                                  726/2
10,430,751 B2 * 10/2019 Wilkinson ............. G06V 40/20
(Continued)

FOREIGN PATENT DOCUMENTS

WO    2008/008448 A2    1/2008

OTHER PUBLICATIONS

PCT International Search Report and Written Opinion of PCT International Application No. PCT/US2018/066395, dated Mar. 6, 2019.

*Primary Examiner* — Mark E Hershley
(74) *Attorney, Agent, or Firm* — Bookoff McAndrews, PLLC

(57) ABSTRACT

The cloud hybrid application storage management system spans local data center and cloud-based storage and provides a unified view of content and administration throughout an enterprise. The system manages synchronization of storage locations, ensuring that files are replicated, uniquely identified, and protected against corruption. The system ingests digital media assets and creates instances of the assets with their own identification and rights and houses the identification and relationships in a CAR (Central Asset Registry). The system tracks the different instances of the assets in multiple storage locations using the CAR, which is a central asset registry that ties together disparate digital asset management repository systems (DAMs) and cloud-based storage archives in which the instances reside. While the invention treats and manages multiple files/instances (Continued)

Hybrid Storage Management System independently, the CAR identifies them as related to each other.

26 Claims, 4 Drawing Sheets

Related U.S. Application Data

(60) Provisional application No. 62/609,393, filed on Dec. 22, 2017.

(51) Int. Cl.
*G06F 16/16* (2019.01)
*G06F 16/23* (2019.01)
*G06F 16/28* (2019.01)

(56) References Cited

U.S. PATENT DOCUMENTS

| | | | |
|---|---|---|---|
| 10,719,492 B1 * | 7/2020 | Edell | G06F 16/214 |
| 10,819,816 B1 * | 10/2020 | Matzkel | G06F 18/2148 |
| 2005/0033747 A1 * | 2/2005 | Wittkotter | H04L 67/63 |
| | | | 707/E17.02 |
| 2006/0062363 A1 * | 3/2006 | Albrett | H04N 21/4532 |
| | | | 348/E7.071 |
| 2006/0123010 A1 * | 6/2006 | Landry | G06F 16/25 |
| 2007/0283417 A1 * | 12/2007 | Smolen | G06F 16/2308 |
| | | | 726/2 |
| 2009/0106234 A1 * | 4/2009 | Siedlecki | G06F 16/81 |
| | | | 707/999.005 |
| 2009/0125387 A1 * | 5/2009 | Mak | G06Q 10/00 |
| | | | 705/14.73 |
| 2009/0222432 A1 | 9/2009 | Ratnakar | |
| 2009/0254572 A1 * | 10/2009 | Redlich | G06Q 10/10 |
| 2010/0063892 A1 * | 3/2010 | Keronen | G06Q 30/06 |
| | | | 705/26.1 |
| 2011/0252071 A1 | 10/2011 | Cidon | |
| 2011/0282727 A1 * | 11/2011 | Phan | G06Q 30/0241 |
| | | | 705/14.1 |
| 2013/0340007 A1 * | 12/2013 | Eyer | H04N 21/812 |
| | | | 725/116 |
| 2014/0006951 A1 * | 1/2014 | Hunter | H04N 21/4821 |
| | | | 715/719 |
| 2014/0047560 A1 * | 2/2014 | Meyer | G06F 21/10 |
| | | | 726/28 |
| 2014/0074629 A1 * | 3/2014 | Rathod | G06Q 10/10 |
| | | | 705/14.73 |
| 2014/0245015 A1 * | 8/2014 | Velamoor | H04L 63/10 |
| | | | 713/171 |
| 2014/0304836 A1 * | 10/2014 | Velamoor | G06F 21/6209 |
| | | | 726/28 |
| 2015/0100578 A1 | 4/2015 | Rosen | |
| 2015/0163206 A1 | 6/2015 | Mccarthy et al. | |
| 2015/0281319 A1 * | 10/2015 | Maturana | G05B 19/4185 |
| | | | 709/202 |
| 2015/0294633 A1 * | 10/2015 | Jung | H04N 51/52 |
| | | | 345/212 |
| 2015/0310188 A1 * | 10/2015 | Ford | H04L 63/101 |
| | | | 726/28 |
| 2015/0347447 A1 | 12/2015 | Ho et al. | |
| 2016/0189084 A1 | 6/2016 | Galuten | |
| 2017/0041296 A1 * | 2/2017 | Ford | G06F 21/64 |
| 2017/0109391 A1 * | 4/2017 | Rosen | G06F 16/5866 |
| 2017/0220605 A1 * | 8/2017 | Nivala | G06F 16/282 |
| 2017/0272209 A1 * | 9/2017 | Yanovsky | G06F 12/0253 |
| 2017/0374392 A1 * | 12/2017 | Hart | G06F 16/74 |
| 2018/0039942 A1 * | 2/2018 | Rogers | G06F 16/2379 |
| 2019/0180146 A1 | 6/2019 | Sacheti | |
| 2020/0097992 A1 * | 3/2020 | Hasan | G06Q 30/0226 |

* cited by examiner

FIG. 1 Hybrid Storage Management System

Asset Upload Sequence

Asset Pruning Sequence

Asset Restore Sequence

CLOUD HYBRID APPLICATION STORAGE MANAGEMENT (CHASM) SYSTEM

CROSS-REFERENCE TO RELATED APPLICATION

This application is a continuation application of U.S. application Ser. No. 16/771,002 filed on Jun. 9, 2020, which is now U.S. Pat. No. 11,550,811, which is a U.S. national phase application of PCT/2018/066395 filed on Dec. 19, 2018, which claims the benefit of U.S. Provisional Application No. 62/609,393, filed Dec. 22, 2017, each of which is incorporated by reference herein in its entirety.

TECHNICAL FIELD

The invention relates to cloud and on-premises file storage. More specifically, the invention relates to a cloud hybrid application storage management (CHASM) system that provides a unified view of content and administration and manages synchronization of storage locations.

BACKGROUND

In the current television economy, cable networks are challenged to share video content between disparate distribution channels—linear broadcast, social networks, mobile devices, TVE (TV everywhere) and over the top content (OTT). Multi-platform distribution requires the coordinated integration of vendors, technology, distribution methods, and video formats. In addition, all of these distribution channels are becoming global, layering on numerous different language and captioning requirements to distribution.

Cloud storage faces hurdles with regard to commercial uptake. Users express concerns regarding access speed and latency, as well as apprehension about security, compliance, and data portability. Migration of media operations to the cloud, replication of complete eco-systems, storage, file operations, latency, and license obligations regarding various products present a variety of challenges for many operators.

One challenge is to integrate and govern a combination of cloud storage and on-premises file storage systems without altering existing on-premises infrastructure or the applications. Additional variables are introduced when services must be provisioned from different sources yet must act and interact as a single system.

Different suppliers try to solve this in different ways, including accessing everything via an Internet Small Computer System Interface (iSCSI), integrating primary storage with the cloud or via a cloud gateway of some sort, for example. One popular route is a hybrid cloud storage appliance, which has intelligence, software, and local storage built into it. Application servers communicate with the appliance and never directly to the cloud. By caching data locally, the appliance provides more bandwidth than a wide-area network, reduces bandwidth and storage costs, and minimizes the effects of link latency. The appliance can also deduplicate and encrypt data before staging it in the cloud.

Another route is to hybridize the application. Many mission-critical applications are vertical in nature, with tasks moving through a stack of functionality and usually ending up in a database. While this database might be too sensitive (and too large) to host in the cloud, other elements—such as the web-based graphical user interface (GUI)—may be better candidates for cloud hosting.

For example, many modern applications are designed with a web front-end process that uses a browser or a series of RESTful application programming interfaces (APIs) that provide interoperability between computer systems on the network to present information to users and obtain updates. This model makes it easier to accommodate different mobile devices or changes to the language, and it could also be cloud-hosted.

If the application does not have a web front end, information often flows through the stack and finds the specific software component where formatting meets information processing. This is the logical GUI/application service boundary, and it is where systems use that component's interfaces and APIs to connect a web front end.

These configurations assume that the user can host the data itself and provide adequately fast access to it, probably via a query-server model. This allows cloud services to send database requests to a server and have it return only the specific data that is needed, thereby reducing traffic, delay, and cost. The systems may also need to add load balancing at the service boundaries, deploying extra copies of each service as needed.

For transaction processing systems, however, speed and latency issues mean that running on remote storage is rarely an option and some other type of application storage management is needed.

For example, one storage vendor solution is to partner with cloud-connected colocation (colo) facilities to access high-speed, low-latency local connections that the major cloud providers make available to nearby data centers. This enables the storage vendor to host its files in a colocation and connect them directly into the hyperscalers and other architectures that scale appropriately as increased demand is added to the system. The vendor can then cloud-host the applications while the data remains on private storage. Alternatively, on-premises replication to cloud-connected filers can be employed for disaster recovery, so if the primary data center is lost, the applications can be spun up in the cloud instead.

While previous systems employ techniques that solve some of the problems associated with a hybrid storage system, no systems to date are able to provide sufficient benefits in a seamless storage management system while managing high value video archives and media operations.

SUMMARY

The invention addresses the substantial and significant gap that presently exists in the storage market. There is no vendor-agnostic means to manage both ground-based and cloud storage. Traditional storage vendors are threatened by cloud-based storage solutions and thus build proprietary extensions to use the cloud as deep archive. Cloud vendors have no desire to extend their solutions to the ground other than to migrate users to the cloud. This leaves cable networks and video content providers in an "all or nothing" scenario when selecting storage products and provides what is essentially expensive licensed ransomware. As soon as the network or other media asset company stops licensing the vendor's storage software, the networks' files are locked out of their control, or even worse, removed.

The invention solves this and other problems by providing both a storage management solution that spans local data center and cloud-based storage, and a unified view of content and administration. The hybrid storage application invention manages the synchronization of storage locations, ensuring that files are replicated, uniquely identified, and protected against corruption. The invention manages the integrity of both storage pools through business processes that add files from the ground or the cloud (e.g., automated transfers, manual deletion, and file creation). The invention incorporates intelligent forecasting of storage performance based on publishing schedules and allows pre-fetch of content to higher performance storage and allows down grade of content to more cost-effective storage. It also allows ad hoc movement of files by users and systems alike by way of service requests. Further, the invention maintains a locked-down "golden copy" of each file to ensure that accidental deletions do not occur. The system replicates the "golden copy" of the file to the caches.

Likewise, the invention uses multiple and configurable storage mechanisms that are vendor-neutral and capitalizes on the use of lossless UDP (User Datagram Protocol) to move large files along with smaller files in different contexts.

The storage management system of the invention is location-aware, tracking multiple copies of a video asset in multiple locations. This architecture extends to include international versions of domestic content (e.g., the asset "Property Brothers" in PAL video format with Dutch subtitles) extending the central view to include regional instances (files) of a video asset. An "instance" is a specific realization of an object—in this case, the object is the Property Brothers episode, and the instances of the object are the created variations of the object, such as a regional copy of the episode with regional advertisements, for example.

The storage management system of the invention integrates cloud storage and on-premises storage seamlessly to create a greater overall value. The system stores data in locations that make the most business sense, whether based on risk classification, latency, bandwidth needs, workflow sharing, distribution, archiving, and backup concerns. The system provides workflows and/or tasks to continue in the event of any number of server restarts. It provides a resilient management system. Additionally, the system provides resilience by including asynchronous messages or retry requests covering network uptime gaps in HTTP requests or message bridges between cloud and on-premises message queues.

Similarly, the invention facilitates seamless dataset initialization/seeding by way of workflow manipulation. It sets up in-progress data flows, to be followed up by batch data transfer processes, at which time the system can finalize and register the bulk uploaded assets or data transfers.

The system of the invention takes advantage of scalability and cost-effectiveness of cloud storage while providing benefits of on-premises storage as many organizations cannot divorce themselves entirely from ground-based operations and need cloud storage to support digital rights and global access. Most cable networks and other media asset companies are in a position where they cannot eliminate ground-based media operations entirely. Linear broadcast remains a ground-based operation tethered to existing means of distribution (e.g., satellite uplink). Non-linear video distribution is also encumbered due to legacy investment and lack of parity between licensed and cloud-based products (i.e., video transcoding and frame rate correction).

The corporate storage landscape has become even more fragmented with the onset of global operations. Now, in addition to domestic video archive, there are regional archives of the same video, converted to local markets. The invention creates storage management that spans local data centers and cloud storage facilities and incorporates multiple regional video archives.

The system of the invention facilitates incoming video production submissions via file transfers to a cloud infrastructure, eliminating tape operations. The system takes advantage of the cloud benefits for business continuity and disaster recovery while continuing to leverage investments in transcoding, standards conversion, and cadence correction.

The invention includes a cloud-hybrid application storage management system for providing a unified view of digital assets and managing synchronization of storage locations in an enterprise. The system includes a computer readable data storage device storing instructions for executing a distribution of digital assets and a processor configured to execute the instructions to perform a method of distributing the digital assets.

In one example embodiment, the computer readable data storage device stores instructions, and the processor is configured to execute the instructions, to ingest an instance of a digital asset from a distribution source, using an ingest application. The system then uses an enterprise digital asset management service to receive a call to store the instance of the digital asset. The ingested instance of the digital asset is stored in a repository. The system then uses an enterprise asset registration service to extract metadata tags from the instance of the digital asset and registers the metadata tags from the instance of the digital asset in an instance record in a central asset registry. The system also registers metadata tags from the instance of the digital asset in a location record in the central asset registry. The ingest application then sends an instance event to a messaging service notifying the enterprise that the instance of the digital asset has been created and its location.

In some example embodiments of the invention, the central asset registry has a relationship registry and a rights registry. The central asset registry can update the relationship registry and the rights registry upon updating the location of the instance of the media asset. In some implementations, the central asset registry is a graph database. The graph database can include graph objects corresponding to the rights information of the digital assets and a categorization of the graph objects representing a rights hierarchy of the digital assets. The graph database can include a property graph data model with nodes, relationships, properties, and labels in a rights hierarchy of the digital assets. The property graph data model can include inbound and outbound intellectual property rights.

In some example implementations of the invention, the instance is first stored on premises. For example, in the cloud-hybrid application storage management system, the repository can be an on-premises enterprise storage system co-located with the computer readable data storage device and the processor.

Some example embodiments of the invention include an instance record that incorporates graph database properties. That is, the instance record can include a relationship tag, where the relationship tag includes a relationship name and a hierarchical direction of the instance with respect to a golden copy of a source file of the digital asset. Additionally, the instance record can include an asset identifier.

The invention can utilize metadata tags that incorporate specific information used to characterize the instance of the digital asset. For example, metadata tags from the instance of the digital asset can include a file modification time, a file access time, a file creation time, a file mime type, an originating location of a source of the instance of the digital asset, and/or a storage size. Similarly, the instance of the digital asset can include technical metadata of an instance type, a media type, a media format, a file size, an encoding, a codec, a resolution, an aspect ratio, a bit rate, a frame rate, a language, and/or a creation time.

In some embodiments of the invention, the system can use a location record that includes checksums, file path names, a name of an application that updated the location record, and/or a time of update. Likewise, the location record can include an identification of the repository in which the ingested instance is stored.

In this fashion, the invention ensures that the system includes an instance of a golden copy of the digital asset and has notified the rest of the enterprise that it exists. The invention also moves the ingested file to a suitable archive location based on the instance of the digital asset and rules and actions associated with the instance.

For example, the computer readable data storage device (in 105) can store additional instructions for executing a distribution of digital assets, and the processor (in 105) can further execute the additional instructions to receive, with a manager agent (06), the instance event and identifying an inbound storage location identifier and an archive storage location identifier based upon the instance event. The system can request, with the manager agent (06), creation of a new upload copy operation for copying the instance of the digital asset to an archive database. The asset registration service can receive the registered metadata tags of the instance from the central asset registry (05) and create an upload copy operation based on the received metadata tags of the instance from the central asset registry. The central asset registry can create an upload profile for the instance of the digital asset, where the upload profile includes upload copying actions based on the received metadata tags of the instance. The system can then use the upload profile to copy the instance of the digital asset to the archive database and use the manager agent to register the location of the new instance of the digital asset in the central asset registry (05) to provide an enterprise-wide view of an updated location of the instance of the digital asset.

In some example embodiments of the invention, uploading the new instance of the digital asset can include a transfer path and/or key for the archive and relationships and rights in the instance of the digital asset. For example, the system can identify an archive storage location identifier by calculating a transfer path for the upload based upon a relationship stored in a relationship registry of the central asset registry and/or rights associated with the instance of the digital asset stored in a rights registry of the central asset registry. The relationship can include a hierarchical relationship of the instance of the digital asset to a golden copy of a source file of the digital asset, and the rights associated with the instance of the digital asset can include inbound and outbound intellectual property rights of the instance of the digital asset.

In some examples of the invention, creating the upload operation can include letting the enterprise know that the operation has started. For example, the manager agent can trigger an upload copy operation event to a messaging service to let the enterprise know that a new workflow for the upload copy operation of the instance of the digital asset has started. Similarly, uploading the new instance can include using the manager agent to create a workflow record to track events related to the upload. Creating an upload copy operation can also include a storing operation, such as persisting the upload copy operation in a workflow database.

Additionally, in some example implementations creating the upload profile with the central asset registry can include using the manager agent to receive a transfer identifier from a transfer manager service to instruct transfer layers to initiate the copying operation. Further, the media file and the upload profile can be copied from the repository into the archive database to store the instance of the media asset, and an archive complete event can be sent to a messaging service indicating file movement into the archive database has been completed.

Creating the upload profile with the central asset registry can include creating upload copying actions based on source indicator metadata tags and/or scheduling metadata tags. The upload profile can also include actions to take upon completion of the copying. For example, the actions to take upon completion of the copying can include deleting an existing object in the destination archive database, deleting a source object in the repository, and/or transferring an additional file to the destination archive database.

Copying the instance of the digital asset to the archive database using the upload profile can include requesting the transfer manager service and transfer layers to perform the copying of the instance of the digital asset from the repository to a cloud archive. The cloud archive can be a public cloud storage resource, for example. Additionally, the system can also copy the instance of the digital asset back into a working cache, migrating the instance of the media asset in the archive database into a low-cost archive, and updating, with the manager agent, the location of the instance of the media asset in the central asset registry to provide an updated enterprise-wide view of the location of the instance of the media asset.

In some example embodiments of the invention, the archive database can be in disparate geographic locations or accessible locations. For example, the archive database can be a restricted cloud account database, and the working cache can be an accessible cloud account cache.

DETAILED DESCRIPTION

Figure 1:
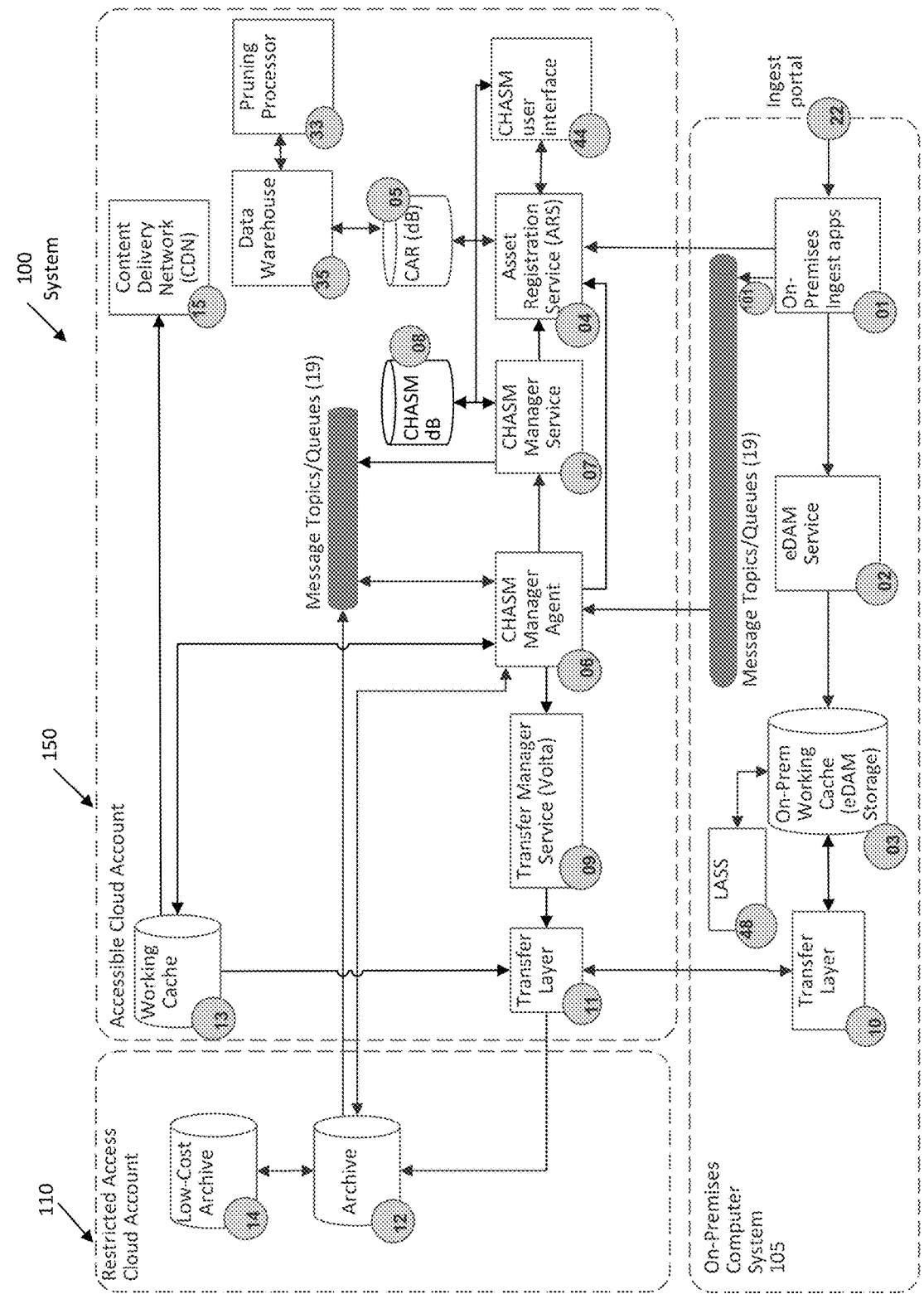
FIG. 1 shows an example hybrid storage management system in accordance with the invention.

Existing commercial products in the storage space are limited in how they address hybrid operations that span the use of cloud resources and traditional data center resources. Commercial products either only address one space (cloud or data center) or limit how storage can be accessed (data center vendors that use the cloud as deep storage).

The invention provides many key features that are lacking in previous systems. For example, the invention provides a single view of storage across disparate cloud and data center products allowing users to take an enterprise-wide view of the assets. The system intelligently manages files to limit the impact of latency in operations. Additionally, the invention performs file movement and queuing based on associated business and technical operations including content distribution scheduling, production receipt, and transcoding operations. The system performs file corruption checks throughout transfer and archive processes and tracks multiple instances of the same file to minimize file movement and decrease latency of operations. For example, international versions of domestic U.S. content are created in the respective region (e.g., EMEA—Europe, the Middle East, and Africa) and then associated back to the domestic U.S. master of the content/asset. The system treats international versions as separate assets and gives them their own unique ID (SCRID). The system houses the SCRIDs and relationships in a CAR (Central Asset Registry). The system tracks the different instances of the assets in multiple locations in the CAR, which is a central asset registry that ties together disparate digital asset management repository systems (DAMs) in which the instances reside. While the invention treats and manages multiple files/instances independently, the CAR identifies them as related to each other.

The system uses multiple and configurable transfer mechanisms to move data between caches or layers in vendor neutral transfers and uses a separate and customizable transfer service, which allows transfers between any vendor. Example transfer services used in the invention include proprietary and commercial transfer products, such as Aspera, or File Transfer Protocol (FTP) or HTTP. Audit logs allow granular metrics of inflight transfers and work in the system.

The system automatically prunes files from the archive based on determined technical and business priority requirements and contractual obligations, optimizes file transport based on file size, and restores files from cloud storage to ground storage. Pruning includes deleting or reallocating files and directories based on predetermined criteria, such as the age of the file, the date the file was last accessed, the number of times the file was accessed, the version of the file, possible corruption of the file, and other criteria. Cloud storage vendors often support only limited lifecycle movement of files, which often exacerbates the enterprise's loss of control and visibility of where the files reside and who may access them. Pruning the files provides proactive control and security of the files, including physical security to the archives, isolation of the archive infrastructure, and security awareness of individuals' identity and ability to access the files. As files move through their lifecycle from creation, metadata tagging, delivery, storage, archiving, and destruction, and are rotated through different storage systems, the files can be automatically pruned based on predetermined criteria to preserve them.

The hybrid storage management system of the invention extends distributed data repository frameworks to provide a hybrid storage management system across local data centers and cloud storage services, such as Amazon S3, GoogleDrive, Box, and OneDrive, for example.

The invention creates storage management that spans local data center and cloud storage services (e.g., Amazon Web Services S3) to multiple regional data centers and allows users to incorporate multiple regional video archives. The system provides supporting services that provide a unified view across internal network attached storage platforms (e.g., EMC Isilon archives, Dell Compellent, Hitachi NAS, HP StoreAll, and IBM SONAS, for example) and online file storage web services (e.g., S3/Glacier account in Amazon Web Services, Google, Azure, and others). The system manages the synchronization of storage locations ensuring that files are replicated, uniquely identified, and protected against corruption. Master video archives are stored in the cloud (e.g., AWS) and ground-based storage is a 4 Peta Byte (PB) cache (i.e., large capacity) used for local media operations including linear broadcast. As outlined above, the storage manager maintains a locked-down "golden copy" of each file to ensure that accidental deletions do not occur. The system replicates the "golden copy" of the file to the caches.

The storage manager of the invention (CHASM manager agent and CHASM manager service) is location-aware, tracking multiple copies of a video asset in multiple locations. This architecture extends to include international versions of domestic content (e.g., as above, "Property Brothers" in PAL video format with Dutch sub-titles) extending the central view to include regional instances of a video asset.

The storage manager of the invention is aware of distribution schedules and other scheduled media operations. As non-linear distribution schedules are published, the storage manager migrates the necessary video files from low-cost Glacier or Backblaze cloud storage to high speed access on Amazon S3, Azure, or Google Cloud. Where jobs are complete, the storage manager reverses the migration, limiting the cost incurred.

Additional benefits of the invention include reduction or elimination of companies' spend for expensive, proprietary ground-based storage and immediate leverage of cloud services platform solutions for storage replication to enable business continuity and disaster recovery planning. Additionally, the invention provides further leverage of investments in licensed products, including scalable media processing platforms (e.g., Telestream Vantage, Livestream, Imagine, etc.), content verification software (e.g., Interra Baton, Venera, Vidcheck, etc.), and image transformation programs (e.g., Alchemy) while the cloud native versions mature to feature parity. The system uses cloud-based products as they fit the complexity of operations. The invention provides an extensible storage architecture that incorporates regional archives, creating a single view of the global archive. The invention progressively adds regional archives and applies that content to global content rights agreements.

FIG. 1 shows the technical details and a flow diagram outlining the system 100 of the invention along with a description of the component blocks. The process begins on-premises (see dashed line reference numeral 105, denoting an on-premises computer system, including a computer readable data storage device storing instructions for executing a distribution of digital assets and a processor configured to execute the instructions). The process begins with the On-Premises Ingest Applications (apps) (01). Ingest apps are the entry point for getting media files into the media asset management (MAM) archive (including the video archive) from various sources. The system 100 can use several ingest apps depending on the type and source of a particular media file. The ingest apps (01) receive the media content source files from various sources including external production companies and internal post-production applications (e.g., Avid). The ingest apps extract metadata from the source files, call the eDAM service (02) to get them stored into the proper on-premises storage location, and register them and their metadata by calling the Asset Registration Service (shown as reference numeral (04) below). The metadata can include file modification times, file access times, file creation times, file mime types, the source (e.g., originating location) of the file, storage size, and other information regarding the file.

Once storage and registration are complete, the system 100 sends an instance event 101 to a message topic (19) to alert the rest of the enterprise (system 100) that there is a new or updated media instance. The storage manager system 100 of the invention extends benefits of a central content (asset) registry (also referred to as the "system asset registry" or "SAR"), which can be plugged in or replaced. Details of suitable central asset registry systems are shown in U.S. patent application Ser. No. 15/192,145 and in U.S. patent application Ser. No. 15/420,478, the disclosures of which are incorporated by reference in this application in their entireties. The storage manager system of the invention provides a vendor neutral or custom(izable) solution.

The eDAM service (02) receives the call to store metadata and source files from the on-premises ingest apps (01). Based on the instance metadata, (e.g., video, still image, text file, etc.) the eDAM service (02) has the proper access to the on-premises storage system (03) and is responsible for placing a file for storage into its proper resting place. Examples of on-premises storage system (03) can be an EMC Isilon archive, Dell Compellent, Hitachi NAS, HP StoreAll, and/or Quantum, or another repository, for example.

The on-premises working cache/eDAM Storage (03) is an on-premises disk array responsible for holding any media files that are needed within the facility (system 100). Media files are initially ingested via on-premises ingest apps (01) into the on-premises working cache/eDAM storage (03) and later moved up to the cloud archive (including archive (12) and low-cost archive (14), such as those provided by Amazon, Google, or Microsoft, example) via transfer layers (10) and (11).

Transfer Layer (10) is the on-premises underlying transfer layer, which copies files from an on-premises storage location (such as eDAM storage (03), for example) to a cloud-based storage location (such as working cache (13) and archive (14). In one example implementation, this transfer layer (10) is an Aspera Enterprise service using accelerated UDP transport via FASP, but in other example implementations such as FTP, HTTP, AWS S3 multipart transfers, transfer layer (10) can be exchanged for any transfer technology due to the use of the Transfer Manager Service (09) described below. Similarly, Transfer Layer (11) is the cloud side of the transfer layer. In one example implementation, transfer layer (11) is an Aspera Cluster using accelerated UDP transport via FASP but could be exchanged for any transfer technology due to the use of the Transfer Manager Service (09) described below.

The flexibility in transfer and storage effectively makes the on-premises working cache/eDAM storage (03) a write-through cache of the media files. Over time, media files may be pruned out of this cache storage (03) to save space and can be restored back to this cache storage (03) in order to perform various functions via tools that may require block storage access to these files. The pruning and restoration processes are described further below with reference to FIGS. 3 and 4.

The eDAM Service (02) stores the media files and metadata files in eDAM storage (03) and archives (12) and (14), and the assets and metadata are available to the system 100 as a result of the registration of the source files and metadata using Asset Registration Service (ARS) (shown as reference numeral 04). Asset Registration Service (04) interacts with the Central Asset Registry (CAR) database (05). The CAR dB (05) is a database for storing the registration information of all intellectual property media assets, relationships between those assets, various file instances of those assets, and the current location of those instance files. In this example implementation, "instance" refers to the tangible asset being stored, that is, the physical asset that would be distributed. The central asset registry database (05) tracks rights to assets and of assets.

The CHASM Manager Agent (06) listens for various events within the organization (system 100) relating to media instance or file movement state transitions and performs the overall steps of workflow that need to occur to get the file moved into archive/cache, restored from archive, or removed from cache. "Events" within the enterprise/organization can include the arrival of a new instance of an asset, removal of an instance of an asset, replacement of an instance of an asset, and other state transitions of an asset or an instance of an asset. The same manager agent can listen to multiple queues and/or can be broken into smaller agents listening to individual or smaller queues as well. The CHASM manager agent (06) monitors and manages the working cache (13) and archive (12) in the cloud (shown as dotted-line reference numeral 150). The system (100) uses asynchronous workflow tasks, which are independently aware of their scope within a larger scope of work, allowing task processors to delete messages which no longer need to be processed due to the task already being done by a different component of the system. The system (100) achieves this by placing a workflow identifier in each message, which triggers the asynchronous workflow tasks. Then, as the CHASM Manager Agent (06) receives these messages, and before doing other processing, it first checks the current state of the overall workflow by making a call to the CHASM Manager Service (07) to retrieve the current state of the workflow and is then able to ignore and skip any processing that may have already been performed, thus making each operation independent. The system architecture allows computer resource optimization by breaking up independent tasks and/or groups of tasks into logic capable of being run on separate processes as a cohesive system.

The CHASM Manager Agent (06) sub-system also ensures the integrity of the files post-transfer and keeps the CAR dB (05) up to date. The manager agent (06) takes action to move the files to where they are directed to reside and updates all registrations as/after the moves are made. The system 100 determines where the assets should reside based on where (at what point) the asset is in the workflow and the asset and instance type. For example, the CHASM manager agent (06) receives messaging when a new instance is received in the enterprise and invokes the transfer agent to move the asset. The CHASM manager service (07) invokes the transfer manager service (09) to perform the transfer. The CHASM manager service (07) tracks the status of the workflow and the CHASM manager agent (06) receives the message when there are status changes to the instance/asset.

CHASM Manager Service (07) finds and tracks the current state of file movement workflows. The manager service (07) takes a snapshot of file locations at any point in time and stores the snapshot of the state of the workflow in CHASM dB (08). CHASM dB (08) tracks the state of the workflows involved in moving files through their various transfers. The CHASM dB (08) stores the snapshots of the status of the files as they are moved around.

Transfer Manager Service (09) abstracts various file transport mechanisms. The transfer manager service (09) interacts with the system 100 to request a media asset file download, to restore a media asset file, and to replace the current version of an archive file with a previous version of the file. The transfer manager service (09) also reports status and location of asset files to the Asset Registration Service (ARS) shown as reference numeral (04). Based on transfer profiles invoked, transfer manager service (09) will have a file moved from source to destination using FTP, SFTP, Aspera FASP, and other fast file transfer mechanisms and protocols. This allows the transfer layers (10) and (11) to be replaceable by any transfer technology in a modular fashion and makes the system (100) transport-agnostic. The transfer manager service (09) determines and enacts the transfer mechanism/protocol based on the configuration of the origin storage facility and the configuration of the destination storage facility.

In one example implementation of the system (100), the transfer manager service (09) enacts transfer layer (11) to store the asset and/or metadata in archive (12). Archive (12) is a secure enclave cloud storage system (i.e., cloud side storage facility that includes both working cache and low-cost archive (see working cache (13) and low-cost archive (14) below). Security is implemented by the archive (12) residing in its own cloud account, such as a separate VPC (see dashed line reference numeral 110) with extremely limited and protected access. The goal of these security measures is to never lose a media file. Once files are placed into the archive (12), they are also immediately moved to the working cache (13) where systems and processes, such as transcoding and delivering files to (distribution partners) may act upon them. After the files are successfully moved into the working cache (13), they may be moved into a low-cost, high resiliency archive (14) in order to reduce cost. In one example implementation, the archive (12) is a versioned AWS S3 bucket while other example implementations use other cloud storage facilities, such as an AWS S3 bucket backed by Glacier.

As outlined above, working cache (13) is the storage medium where systems and processes interact with or utilize the media files for viewing, copying, bundling, transcoding, delivering, etc., while low-cost archive (14) is a deep archive storage medium. Once files arrive in the archive (12), after a predetermined amount of time has passed, the transfer layer (11) will move the files to a lower cost deep archive solution (low-cost archive (14), for example). In one example implementation, low-cost archive (14) is AWS Glacier and a lifecycle policy is implemented on the Archive S3 bucket (i.e., archive (12)) to automatically move and manage that transition. The system 100 can implement a variety of life cycle policies depending upon the type of asset(s), the rights associated with the asset(s), and other lifecycle policy considerations. In other example implementations, low-cost archive (14) is another cloud-based backup storage system, such as Carbonite, Backblaze, SOS Online Backup, SugarSync, and other cloud-based backup systems.

While other storage management systems struggle to provide adequate speed and security for media assets, the system 100 includes content delivery network (15), which provides the media files more rapidly to business users and systems around the globe. In one example implementation, content delivery network (15) is AWS CloudFront, while in other implementations, other globally-distributed networks of proxy servers (e.g., Akami, LimeLight, Level3, etc.) cache content (e.g., web videos, etc.) locally to end users. The global content delivery network services (15) are used to securely deliver data, videos, applications, and APIs to viewers. Based upon the format of the files and the location/type of storage media used, the global content delivery network can deliver the files with low latency and high transfer speeds. The content delivery network (15) provides media files (e.g., video proxies, closed captions, audio files, deliverables, recipes, and other media files) around the globe.

The cloud hybrid application storage management system architecture and techniques of the invention provide a unified view of content and administration and manage synchronization of storage locations when uploading files to the system (ingest), when archiving files from an on-premises storage location to an archive storage location (pruning), and when restoring files from an archive storage location to an on-premises storage location (restore).

Upload Workflow (Ingest)

Figure 2:
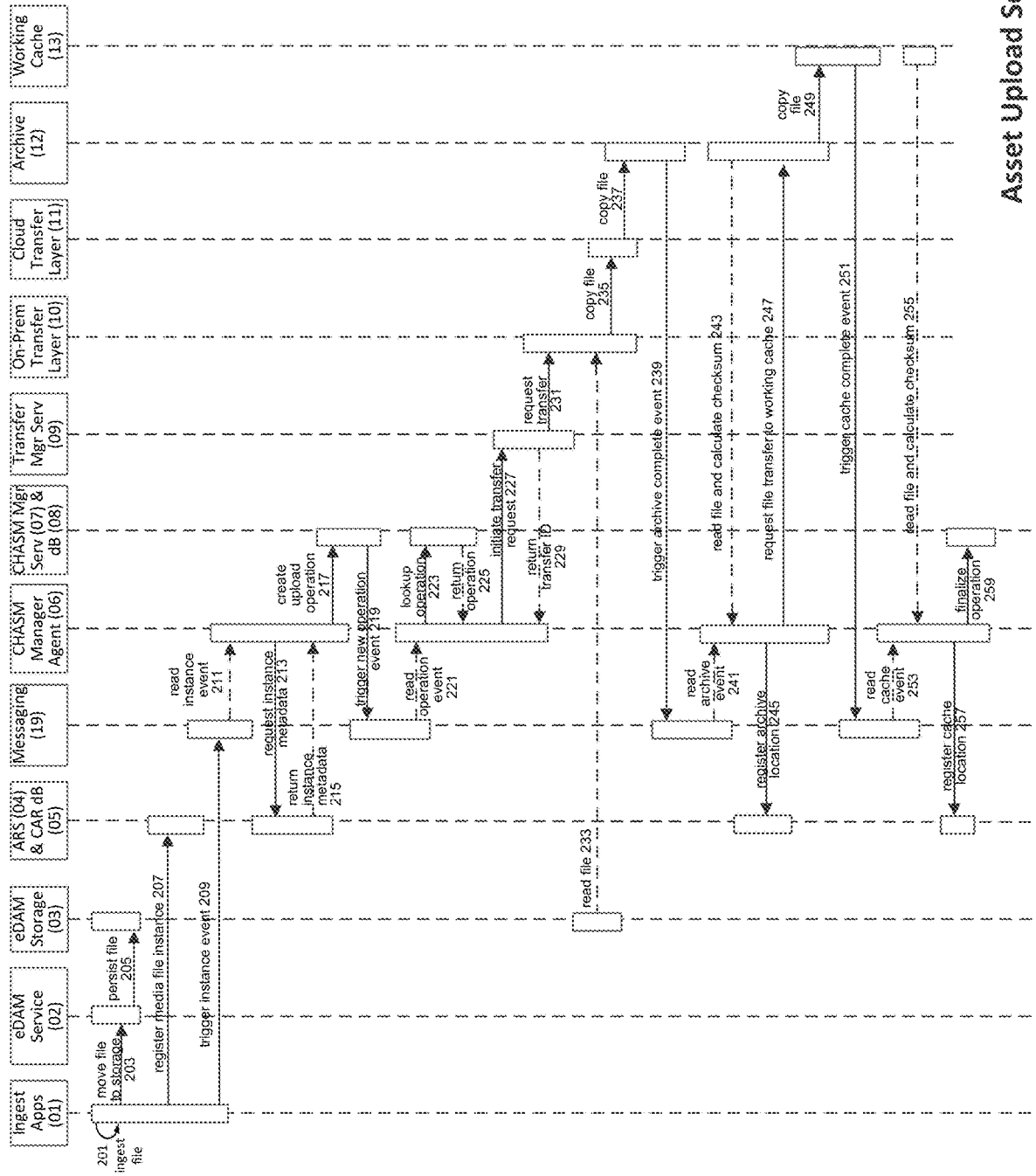
FIG. 2 shows an asset upload sequence diagram detailing the process of a file being ingested into a hybrid storage management system as shown in FIG. 1.

FIG. 2 illustrates the Upload Workflow, which is the process of ingesting a file into the system (100), including the file's replication to the various cloud storage locations, file verification, and location tracking.

As a media file is ingested or re-ingested into an existing on-premises ingest application (01) in block 201, the media file is placed into eDAM storage (03) via the eDAM Service (02) in blocks 203 and 205, where the file is persisted. As outlined above, the media file can have many "instances." An instance is a specific physical realization of the media file. Each instance is a record of the file's existence along with its own technical metadata, many of which can be unique to the individual instance. Since each instance is a specific realization of the (proper) media asset, each instance can be identified and tracked individually through the enterprise. The assets can be viewed as having a hierarchy, according to which the (proper) media asset is at the top of the hierarchy, and the instances of the asset are at a lower level in the hierarchy.

The invention capitalizes on media content organized into a (graph database with a) hierarchical tree of nodes. Details of media content graph databases are described in U.S. patent application Ser. No. 15/192,145 and in U.S. patent application Ser. No. 15/420,478, the disclosures of which are incorporated by reference in this application in their entireties. For example, each node in the hierarchy can represent media content, such as a television show, season, episode, segment, or other content. The system can navigate between nodes of the graph with a user interface. In one example embodiment, the system employs a property graph data model with nodes, relationships, properties, and labels. The nodes function as containers for properties. The system uses nodes to represent "things" or "entities" or other things with identities in the realm of media assets, such as cable television content and other non-linear media content including videos viewed on websites, social media, standalone kiosks, and the like. Every node can contain one or more "properties," and the properties represent attributes or qualities of the nodes. The nodes connect or relate to one another with "relationships." Each relationship has a name and a direction to help structure the overall data set and to lend semantic clarity to the data set to understand the context of each of the nodes. The system also attaches properties to the relationships to denote a quality of that relationship (e.g., a qualifier, a weight, etc.). The system also uses metadata (tags) to denote qualities such as a time stamp, or a version number, or the like. Further, the system uses "labels" to assign roles to the nodes. The system can attach one or more labels to each of the nodes to represent the role(s) the node plays within the cable television media asset hierarchy. Labels allow the system to index and group the nodes and to associate specific constraints with the nodes.

One example ingestion of a media file (asset) (see block 201) occurs when a production company delivers a video file for Episode 7 of Season 4 of HGTV's popular television show "Fixer Upper." As shown in FIG. 1, production companies deliver media file assets, such as video files, via a portal (22) that securely uploads the files, tracks the files, and invokes the appropriate ingest application (01) to further process the files. This video file is named HD111483_HFXUP-407H_I.MXF as shown below. The ingest app (01) makes a service call to the eDAM service (02) in block 203 in order to get the file moved onto the on-premises eDAM Storage system (03) in a managed location edam/mbr/broadcast/1114/HD111483_HFXUP-407H_I.MXF in block 205. Once the file is successfully in place on managed storage, the ingest app (01) makes a service call in block 207 to the Asset Registration Service (ARS), shown as reference numeral (04), to create a new instance record attached to the Fixer Upper Season 4 Episode 7 instance including technical metadata about the file such as codec, frameRate, bitRate, etc. The instance record would have the following data:

```
{
    "guid" : "a5b79514-7ebc-4062-9d23-f156627b1c6e",
    "instanceType" : "broadcast",
    "mediaType" : "digital-movie-file",
    "mediaFormat" : "mxf",
    "mediaFileSize" : 24342506348,
    "mediaEncoding" : "4:2:2 8",
    "mediaCodec" : "MPEG-2 422P-HL Long GOP",
    "mediaVerticalResolution" : 1080,
    "mediaHorizontalResolution" : 1920,
    "mediaAspectRatio" : "16:9",
    "mediaBitRate" : "50 Mbps",
    "mediaFrameRate" : "29.97 fps",
    "language" : "en_US",
    "md5" : "61467ea5c8f343e9b8084cfb291ddb3a",
    "createdBy" : "MBRIngest",
    "createdTime" : "2017-12-27T20:01:29.722Z",
}
```

Upon completion of block 207, the media file instance with its metadata and relationship to the proper media asset is registered into the Central Asset Registry (CAR) (05) via the Asset Registration Service (ARS) shown as reference numeral (04). In addition to the instance record, the asset registration service (04) also registers a new Location record in the central asset registry (05) that tells the system 100 that the file is currently resident on the eDAM storage system (03). The location record includes the following data:

```
{
    "name" : "isilon-knox",
    "md5" : "61467ea5c8f343e9b8084cfb291ddb3a",
    "path" : "edam/mbr/broadcast/1114/HD111483_HFXUP-407H_I.MXF",
    "updatedBy" : "MBRIngest",
    "updatedTime" : "2017-12-27T20:01:29.726Z"
}
```

In this example of a system of the invention, the location record includes the name of the eDAM storage system (03) (i.e., isilon-knox) and the md5 checksum and filename path are shown, respectively, as well as the application that updated the location record (MBRIngest) and the time of the update.

After the registration of the instance and location is complete, the ingest app (01) generates and sends an event to a Java Message Service (JMS) topic in block 209. The event notifies the rest of the enterprise that a new instance of the asset has been created. One example event message can appear as:

```
{
    "source":"sni:mam:event:source/mbr-ingest",
    "reporter":"sni:mam:event:reporter/mbr-ingest",
    "eventId":"sni:mam:event/instance",
    "eventCode":"CreateInstance",
    "eventSubcode":"SaveLocation",
    "eventTime":"2017-05-25T17:42:50.057+0000",
    "scrid":"2786729",
    "instanceGuid":"b9980bb7-a521-4589-a350-f6d12a36c372",
    "instanceType":"broadcast",
    "location":{
        "name":"isilon-knox"
    }
}
```

At this point in the ingest workflow, the system 100 includes an instance of a (golden copy) master video file for HGTV Fixer Upper Season 4 Episode 7 and has notified the rest of the enterprise that it exists. To capitalize on the technical innovations of the system to span local data center and cloud based storage while providing a unified view of content and administration, the file needs to be moved into a cloud based storage system and be independently manageable by both the on-premises storage system via standard POSIX file system operation and manageable in the cloud via standard cloud APIs (such as Glacier, S3, and other cloud APIs) and not be bound or restricted by vendor proprietary APIs and access patterns.

To provide this capability, the CHASM Manager Agent (06) receives the instance event in block 211, identifies an inbound location identifier (such as a URL, for example) and an archive location identifier (such as another URL, for example), as well as calculates a path/key for the archive and determines the appropriate service call to make for the upload operation to an inbound storage location (via the Asset Registration Service (ARS) (04)). For example, when an enterprise instance event is created with an event code of a type "CreateInstance," and the location (identifier) is "isilon-knox," the CHASM Manager Agent (06) starts operations to move the file into the proper (archive) storage locations. The CHASM Manager Agent (06) looks up the instance/location records for the file referred to in the instance event from the Asset Registration Service (04). It then creates a workflow tracking record in the CHASM Manager Service (07) to track events related to the upload.

In block 213 the CHASM Manager Agent (06) requests all metadata about the instance from the CHASM Asset Registration Service (04)). In block 215, the Asset Registration Service (ARS) (04) returns the instance metadata and eDAM storage location record from the central asset registry (05). The CHASM Manager Agent (06) then checks the location key or path of the eDAM storage (on-premises) location record and creates an "upload" operation to instruct the system 100 to move the instance (file) of the digital asset at that location key or path to a similar path in the cloud location (archive (12). A similar path in the archive (12) may include a corresponding directory or other location in which the file will be stored. In block 217, the new "upload"

operation is persisted into the CHASM dB (08). Once the operation is created in the CHASM dB (08), the CHASM Manager Agent (06) triggers a CHASM event (e.g., messages/event with payload) onto an AWS SNS topic (or other messaging service) in block 219 to let the enterprise know that a new workflow for an "upload operation" of instance b9980bb7-a521-4589-a350-f6d12a36c372 has started.

In block 221, the CHASM Manager Agent (06) receives the read operation event to know that a new "Upload" operation has been created. The CHASM Manager Agent (06) performs a lookup operation against the CHASM dB (08) in block 223, and the CHASM Manager Service (07) performs a return operation in block 225. Upon receiving the event, in block 227 the CHASM Manager Agent (06) requests the Transfer Manager Service (09) to perform a copy of the media file using a cloud upload profile. The cloud upload profile includes source indicators, scheduling information (e.g., one-time transfer or recurring transfer), actions to take upon completion of the transfer (e.g., delete existing object in the destination, delete source objects, etc.), and other transfer information. The transfer manager service (09) returns a transfer ID as a transaction boundary to the CHASM manager agent (06) in block 229.

In block 231, the transfer manager service (06) understands from this profile to command the Transfer Layers (10 & 11) which are implemented via, for example, Aspera Enterprise, Shares Cluster, and FASP, or other high speed servers capable of transferring large files at high speeds to copy the file from on-premises (eDAM) storage (03) into the Cloud Archive (12) which is a versioned AWS S3 bucket, for example, or other public cloud storage resource. The on-premises transfer layer (10) reads the file in block 233 from the eDAM storage (03) (i.e., on-premises storage) and utilizes the cloud transfer layer (11) to copy the file to the archive (12) in blocks 235 and 237. Once the file has arrived in the Archive (12) (e.g., S3 bucket), in block 239 the archive (12) sends an archive complete event to an AWS SNS Topic or other notification or messaging service (19), for example).

In block 241, the CHASM Manager Agent (06) receives this archive event from the messaging service (19) indicating the file movement into the Archive (12) has been completed. The CHASM Manager Agent (06) then determines the file size of the media file from the event and prioritizes the processing into a lane or pathway. These priority lanes help keep small files from starving at the expense of longer processing large files. The system 100 processes files per relative sizes to allow different pathways for smaller and larger files to move through the system at the same time versus prior systems that often process one category at a time, where larger files take all priority for larger periods of time.

In block 243, the CHASM Manager Agent (06) calculates a checksum on the file to ensure that it matches the checksum of the file from registration time (in block 207 above). That is, the system incorporates checksum files on both ends of the transfers to verify different vendors' products maintained file integrity. After checksum calculation, the location of the file is registered into the CAR DB (05) in block 245. The CHASM Manager Agent (06) updates the file size and registration. Once registered in the CAR dB (05), the location of the asset can be determined throughout the system. Any subsequent media operations simply query the CAR to find the asset and the nearest location for the asset thus reducing latency and improving throughput of the overall system.

After successfully registering the Archive Location into the CAR DB (05), the CHASM Manager Agent (06) leverages the S3 Transfer Manager API or other API to manage large files/directories (guaranteed file movement) and requests a bucket-to-bucket copy of the file from the Archive (12) into the Working Cache (13) in block 247. Once the file is moved into the Working Cache (13) in block 249, the working cache (13) (such as an AWS S3 system, for example) sends an event to an AWS SNS topic (messaging service (19)) in block 251.

In block 253, the CHASM Manager Agent (06) receives the event stating the file has been moved into the Working Cache (13), then in block 255 calculates a checksum of the file to verify the file arrived properly. After checksum calculation, the location of the file is registered into the CAR dB (05) in block 257. The updated registration provides an enterprise-wide view of the location of the asset. In block 259, the file is now finalized into cloud locations and is accessible by other internal cloud systems or available to publish using a commercial content delivery network or other delivery mechanism. One example implementation of the invention uses an AWS CloudFront CDN (15).

After a short amount of time needed to get this file into the Working Cache (13), the file in the Archive storage (12) will be migrated into a deep low-cost storage (shown as reference numeral (14) in FIG. 1), which can be implemented via an AWS S3 lifecycle policy into an AWS Glacier system or a similar low-cost archive. The file moves into low-cost storage after a predetermined time/predetermined event or other lifecycle policy.

As outlined above, the cloud hybrid application storage management system of the invention delivers a federated view of content files and provides unified administration and synchronization of storage locations. In addition to managing storage locations when uploading files to the system, the invention coordinates and reports file movements when archiving files from an on-premises storage location to an archive storage location. By selectively archiving files from expensive quickly-accessed storage locations to less expensive, remote storage locations, the pruning effect of the storage media provides economic and business benefits throughout the system.

Pruning Media Files

Figure 3:
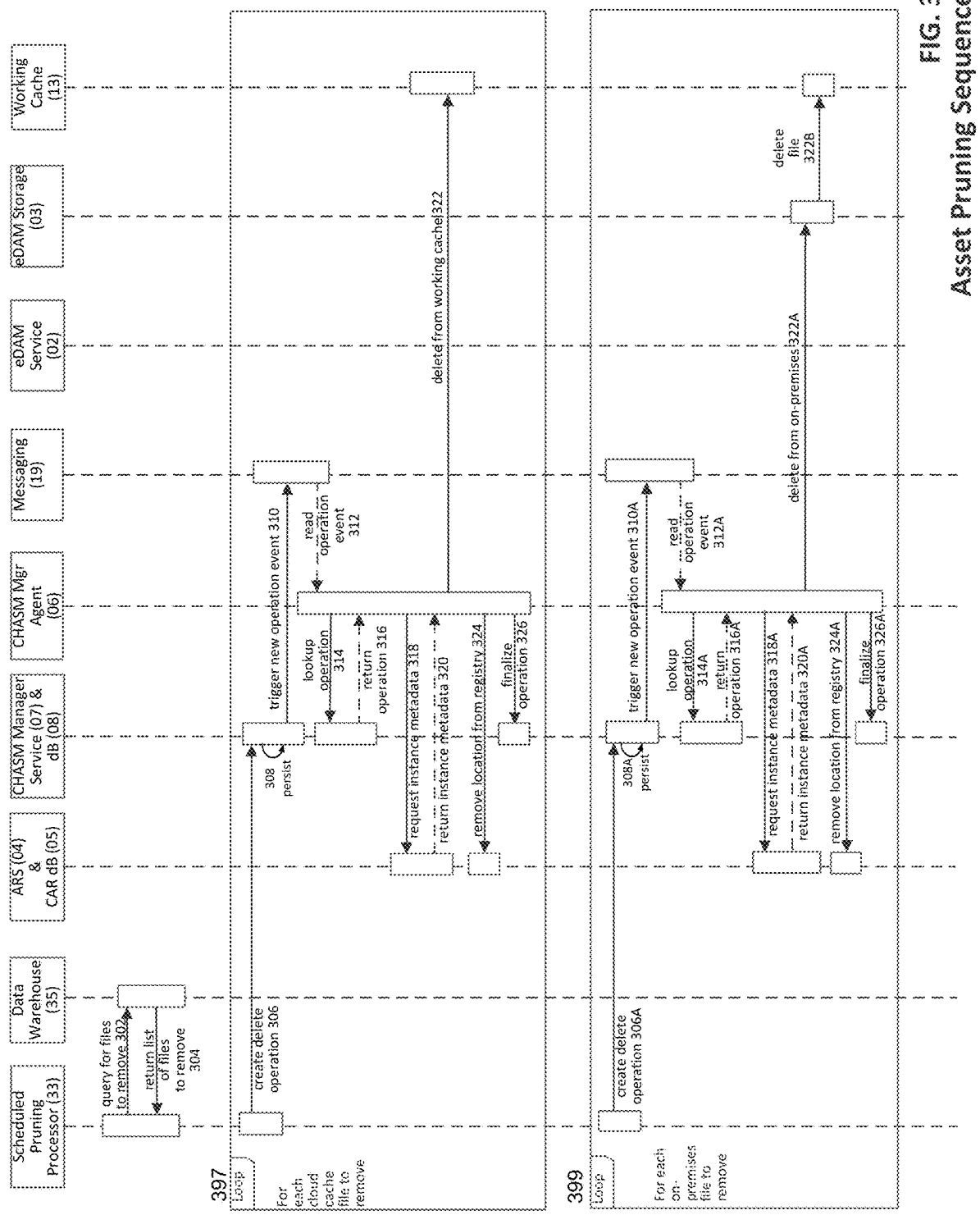
FIG. 3 illustrates a file pruning process which removes files from various locations in a hybrid storage management system as shown in FIG. 1.

FIG. 3 illustrates the pruning process, which removes files from various locations, such as on-premises cache or working cache where they are no longer needed, in order to reduce storage requirements and cost. The system uses rule-based file removal from various locations to overcome past technical limitations that enable the enterprise to reduce operational storage costs while maintaining a real-time view of the asset throughout the enterprise.

Over time media files become accessed far less frequently. They are no longer being aired or delivered to distribution partners. There is no reason to pay for their storage in either the expensive on-premises eDAM storage system (03) or in the cloud-based Working Cache (13).

To overcome prior technical limitations that prevented reliable archiving and retrieval speed, the invention scans the media files, and considers a number of factors to identify media files that are candidates for pruning. The system 100 tracks the individual assets and corresponding metadata and assesses and factors in media file type, age, scheduled air dates, the last accessed time in a local storage medium, the last accessed time in any storage medium, the legal status of the media file (some files must be retained regardless of other factors), editorial status of the media file (e.g., some files may need to be temporarily "frozen" so they are not used for a period of time), and planning/scheduling activation dates. The system removes some files from the eDAM storage system (03) and/or the cloud-based Working Cache (13) locations in order to reduce storage costs while maintaining enterprise-wide visibility and accessibility of the asset. Files are not removed from the Archive (12) for cost purposes.

Based on pruning criteria and pruning algorithms, in block 302 the pruning processor (33) queries data warehouse (35) for files to remove. In block 304, the data warehouse (35) returns a list of files to remove that meet the removal criteria. The pruning processor (33) is a rules engine processor that instantiates a set of business rules and parameters. New rules and parameters can be configured and executed by the processor (33) at any time to create new pruning algorithms and processes. For instance, one of the network's Talent (e.g., Paula Dean) will exit their contract and the network will need to prune all related shows from the active storage (e.g., AWS S3 or on-premises storage) while maintaining a golden copy in deep storage (e.g., low-cost archive (14), such as AWS Glacier). This is an example of a one-time pruning algorithm. There also can be pruning algorithms and processes that run daily or weekly to prune seldom-used assets or assets that have reached a certain age or assets that have met an established predetermined criteria.

For each cloud cache file to remove, the system 100 carries out the pruning process shown in loop 397. Similarly, for each on-premises file to remove, the system carries out the pruning process as shown in loop 399. To start the respective processes, in block 306, the process of FIG. 3 creates "Delete" operations via the CHASM Manager Service (07). The CHASM Manager Service (07) persists the state of the operation into the CHASM dB (08) in block 308. Once the delete operation is created, in block 310, the CHASM Manager Service (07) sends a CHASM event to an AWS SNS topic (or other messaging service (19)). For example, the CHASM Manager Service (07) sends the event to the messaging service as a way of telling the CHASM Manager Agent (06) to read the event from the CHASM dB (05).

The messaging service (19) returns a read operation event to the CHASM Manager Agent (06) in block 312. The CHASM Manager Agent (06) receives the CHASM event to remove a media file from a particular location and looks up the operation with the CHASM Manager Service (07). The instance metadata provides the file location of the instance of the asset. The CHASM Manager Service (07) returns the operation in block 316, and in block 318, the CHASM Manager Agent (06) requests instance metadata from the Asset Registration Service (ARS) (04) regarding the file to be removed. In block 320, the Asset Registration Service (ARS) (04) returns the instance metadata to the CHASM manager agent (06).

With the instance metadata, in block 322, the CHASM Manager Agent (06) makes an appropriate delete call to either the Working Cache (13) via the Archive (12), such as an AWS S3 API, or to the eDAM storage system (03) via the eDAM Service (02). The CHASM Manager Agent (06) will then also remove the location entry in the CAR DB (05) via the Asset Registration Service (04) in block 324 and signals the CHASM Manager Service (07) that the operation is complete in block 326.

As shown in loop 399, when removing a file from an on-premises storage device, such as eDAM Storage (03), the pruning process largely follows the same workflow, but the instance metadata instructs the CHASM Manager Agent (06) to make a delete call to the eDAM storage (03) via the eDAM Service (02) in blocks 322A and 322B.

The cloud hybrid application storage management system 100 of the invention provides a unified view of on-premises content files and cloud-stored content files for administration and synchronization of storage locations. In addition to handling file and storage location integrity when uploading files to the system and pruning files, the invention manages and accounts for file movements when restoring files from an archive storage location to an on-premises storage location.

Restore Files Workflow

Figure 4:
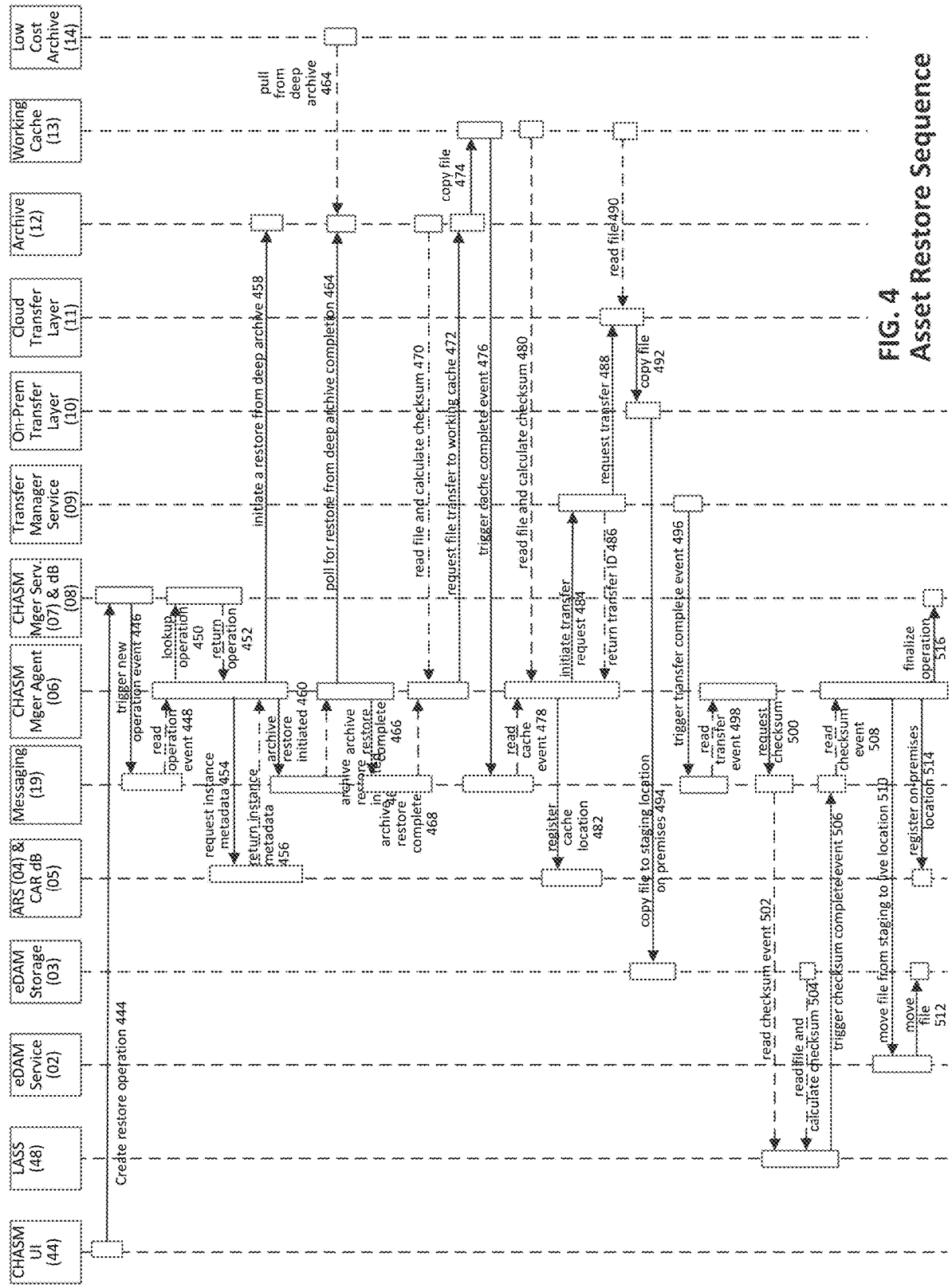
FIG. 4 illustrates a restore workflow process of getting a file out of an archive into useable caches in the cloud and on-premises in a hybrid storage management system as shown in FIG. 1.

FIG. 4 illustrates the Restore Workflow, which is the process of retrieving/getting a file out of the archive into useable caches both in the cloud and on-premises.

After files have been pruned out of various cache locations, it may become necessary to get those files back into a cache. Content providers may sign a new contractual agreement to deliver this content to a non-linear partner or may decide to create new content leveraging portions of older content. Additionally, new distribution agreements and licenses may include one entity providing "some" content to the new partner or when "mosaic" programs are created by assembling new content from past content (e.g., "best of Good Eats").

Users can begin the restore process to get files back into a cache using the CHASM user interface (44) to make a call to the CHASM Manager Service (07) to create a "Restore" operation in block 444. The CHASM user interface (44) is deployed inside the general-purpose cloud account 150 and interacts with the asset registration service (04) and the CHASM Manager Service (07). The CHASM Manager Service (07) triggers a new operation event in block 446 using messaging service (19). The CHASM Manager Agent (06) reads the event from the Messaging service (19) and looks up the restore event operation stored in the CHASM dB (08) in block 450. In block 452, the CHASM manager Service (07) returns the operation to the CHASM Manager Agent (06). As with the pruning operation, the CHASM Manager Agent (06) performs a set of operations in the event of a restore event.

In block 454, the CHASM Manager Agent (06) requests instance metadata from the Asset Registration Service (ARS) (04) regarding the file to be restored. As before, instance metadata can include metadata related to a particular instance of a digital asset, including archive location metadata to locate the instance and to copy it from the storage location into cache. In block 456, the Asset Registration Service (ARS) (04) returns the instance metadata.

In block 458, the CHASM Manager Agent (06) persists a restore operation to the Archive (12) and then triggers a CHASM event (archive restore initiated) to an AWS SNS topic or other messaging service (19) in block 460. In block 462, the messaging service (19) returns the archive restore initiated event to the CHASM Manager Agent (06). The CHASM Manager Agent (06) receives the event, begins polling for completion, and issues a restore operation to the AWS S3 Archive (12) in block 464 in order to move the file out of the low-cost storage (14) and back into the normal Archive (12).

While the restore operation continues, in block 464 the CHASM Manager Agent (06) polls the archive (12) until the S3 restore operation is complete and the file has moved from low-cost storage (14) into the Archive (12). Once the restore operation is complete, the CHASM Manager Agent (06)

sends a message in block 466, and the CHASM Manager Agent (06) picks up the message to move the process forward to the next step.

In block 470, CHASM Manager Agent (06) reads the file and calculates the file checksum. In block 472, CHASM Manager Agent (06) requests the file transfer from the archive (12) into a working cache (13). The system visits/validates the checksum, such as an MD5 check sum, before the user interface (UI) allows a user to request file moves.

In block 474, CHASM Manager Agent (06) receives the event and begins polling the AWS S3 Archive to determine when the asset comes out of (deep) storage in that archive. The CHASM Manager Agent (06) utilizes the AWS Transfer API or other high speed transfer mechanism to perform a bucket-to-bucket copy of the file from the Archive (12) to the Working Cache (13). Once the archive (12) and the working cache (13) S3 finishes copying the file, the working cache (13) sends an event to an AWS SNS topic or other messaging service (19) in block 476.

In block 478, the CHASM Manager Agent (06) receives the finished copying event indicating that the file is now in the working cache (13). In block 480, the CHASM Manager Agent (06) reads the file and calculates the checksum of the file as it resides in the Working Cache (13) and adds the location of the file to the CAR DB (05) via the Asset Registration Service (04) in block 482. This provides one-to-many archive paths and checksums for each path.

Once the Working Cache location is registered, the CHASM Manager Agent (06) invokes the Transfer Manager Service (09) to ask for a file transfer in block 484. The transfer manager service (09) returns the transfer ID in block 486. Based on the source-destination transfer service combination profile inside the transfer manager service (09), in block 488 the transfer manager service (e.g., Volta (09)) requests that the Transfer Layers (10 and 11)—which are implemented via Aspera Transfer Service and FASP in one example implementation—to copy the file from the Working Cache (13) to a staging location in the on-premises eDAM storage system (03). The cloud transfer layer (11) reads the file in block 490 and copies the file to the on-premises storage (eDAM Storage (03)) via on-premises transfer layer (10) in blocks 492 and 494. Once that transfer is complete, the transfer manager service (09) e.g., Volta, sends an event to an AWS SNS topic (or other messaging service (19) in block 496.

The CHASM Manager Agent (06) receives this event in block 498, then calculates a checksum on the file in block 500. Local Async Storage Service (LASS (48)) receives the checksum event in block 502 and the LASS (048) reads the file from the eDAM storage (03) in block 504 to calculate the checksum. LASS (48) supports local file system needs of the system 100, which are asynchronous in nature and can process events that impact the on-premises storage (eDAM storage (03)). This service interfaces with asynchronous events/messages to support users and to avoid long wait times for a synchronous response to calculating a long (MD5) checksum. In block 506, LASS (48) triggers a checksum complete event and sends it to messaging service (19) where it arrives at the CHASM Manager Agent (06).

In block 510, the CHASM Manager Agent (06) instructs the eDAM service (02) to move the file into the proper live location on the eDAM storage system (03). In block 512, the eDAM Service (02) moves the file to new location in eDAM Storage (03). After the file move is complete, the location of the file is registered into the CAR DB (05) via the Asset Registration Service (04) in block 514 and signals the CHASM Manager Service (07) that the operation is complete in block 516.

After completion of these steps, the file is now back in all the cache locations and is accessible on-premises, in the cloud working cache, and from the content delivery network. In one example implementation of the invention, the content delivery network is a CloudFront CDN, while in others, the content delivery network may be Cloudflare, Fastly, Akamai, or other content delivery networks.

The invention provides storage management that spans local data center and cloud-based storage and provides a unified view of content and administration to address gaps in the storage marketplace. The hybrid storage application invention elegantly manages synchronization of storage locations to ensure that files are replicated, uniquely identified, and protected against corruption. Integrity of both storage locations is managed by processes that add files from the ground or from the cloud by way of automated transfers, manual deletion, and file creation. The system incorporates intelligent forecasting of storage performance based on publishing schedules and allows pre-fetch of content to higher performance storage and allows down grade of content to more cost-effective storage. The invention provides user and system movement of files via service requests.

We claim:

1. A cloud-hybrid application storage management method for providing a unified view of digital assets and managing synchronization of storage locations in an enterprise, the method comprising:
   ingesting, from a distribution source, an instance of a digital asset with an ingest application, wherein the ingest application includes executable instructions stored on a computer-readable storage device executable by a processor;
   receiving, with an enterprise digital asset management service, a call to store the instance of the digital asset;
   extracting, with an enterprise asset registration service, metadata tags from the instance of the digital asset;
   storing the ingested instance of the digital asset in a repository;
   registering meta data tags from the instance of the digital asset in an instance record in a central asset registry, wherein the central asset registry includes a pluggable relationship registry and a pluggable rights registry that are modular and changeable without refactoring repositories; and
   wherein the instance record includes a relationship stored in the relationship registry of the central asset registry, and the relationship includes a hierarchical relationship of the instance of the digital asset to a golden copy of a source file of the digital asset; and
   wherein the instance record includes rights associated with the instance of the digital asset stored in the rights registry of the central asset registry, and the rights associated with the instance of the digital asset include inbound and outbound intellectual property rights of the instance of the digital asset;
   registering meta data tags from the instance of the digital asset in a location record in the central asset registry, wherein the location is a location in which the digital asset is stored in the enterprise; and
   sending, with the ingest application, an instance event to a messaging service notifying the enterprise that the instance of the digital asset has been created, its location, and rights associated with the instance of the digital asset.

2. The cloud-hybrid application storage management method of claim 1, wherein the repository is an on-premises enterprise storage system co-located with the computer readable data storage device and the processor.

3. The cloud-hybrid application storage management method of claim 1, wherein the instance record includes a relationship tag, the relationship tag including a relationship name and a hierarchical direction of the instance with respect to a golden copy of a source file of the digital asset.

4. The cloud-hybrid application storage management method of claim 1, wherein the instance record includes an asset identifier.

5. The cloud-hybrid application storage management method of claim 1, wherein metadata tags from the instance of the digital asset include at least one of the group of a file modification time, a file access time, a file creation time, a file mime type, an originating location of a source of the instance of the digital asset, and a storage size.

6. The cloud-hybrid application storage management method of claim 1, wherein the instance of the digital asset includes technical meta data of at least one of the group of an instance type, a media type, a media format, a file size, an encoding, a codec, a resolution, an aspect ratio, a bit rate, a frame rate, a language, and a creation time.

7. The cloud-hybrid application storage management method of claim 1, wherein the location record includes a checksum and a filename path and a name of an application that updated the location record and a time of update.

8. The cloud-hybrid application storage management method of claim 1, wherein the location record includes an identification of the repository in which the ingested instance is stored.

9. The cloud-hybrid application storage management method of claim 1 further comprising:
    receiving, with a manager agent, the instance event and identifying an inbound storage location identifier and an archive storage location identifier based upon the instance event;
    requesting, with the manager agent, creation of a new upload copy operation for copying the instance of the digital asset to an archive database;
    receiving, with the asset registration service, the registered meta data tags of the instance from the central asset registry and creating an upload copy operation based on the received metadata tags of the instance from the central asset registry;
    creating, with the central asset registry, an upload profile for the instance of the digital asset, wherein the upload profile includes upload copying actions based on the received metadata tags of the instance;
    copying the instance of the digital asset to the archive database using the upload profile; and
    registering, with the manager agent, the location of the new instance of the digital asset in the central asset registry to provide an enterprise-wide view of an updated location of the instance of the digital asset.

10. The cloud-hybrid application storage management method of claim 9, wherein identifying an archive storage location identifier includes:
    calculating a transfer path for the upload based upon at least one of the group of a relationship stored in the relationship registry of the central asset registry and rights associated with the instance of the digital asset stored in the rights registry of the central asset registry, wherein the relationship includes a hierarchical relationship of the instance of the digital asset to a golden copy of a source file of the digital asset; and
    wherein the rights associated with the instance of the digital asset include inbound and outbound intellectual property rights of the instance of the digital asset.

11. The cloud-hybrid application storage management method of claim 9 further comprising:
    triggering, with the manager agent, an upload copy operation event to a messaging service to let the enterprise know that a new workflow for the upload copy operation of the instance of the digital asset has started.

12. The cloud-hybrid application storage management method of claim 9, wherein creating an upload copy operation based on the received metadata tags from the central asset registry includes:
    creating, with the manager agent, a workflow record in a manager service {–(P}to track events related to the upload.

13. The cloud-hybrid application storage management method of claim 9, wherein creating an upload copy operation based on the received metadata tags from the central asset registry includes:
    persisting the upload copy operation in a workflow database.

14. The cloud-hybrid application storage management method of claim 9, wherein creating the upload profile with the central asset registry includes:
    receiving, with the manager agent, a transfer identifier from a transfer manager service to instruct transfer layers to initiate the copying operation;
    copying the media file and the upload profile from the repository into the archive database to store the instance of the media asset; and
    sending an archive complete event to a messaging service indicating file movement into the archive database has been completed.

15. The cloud-hybrid application storage management method of claim 9, wherein creating the upload profile with the central asset registry includes creating upload copying actions based on at least one of the group of received source indicator metadata tags and received scheduling metadata tags.

16. The cloud-hybrid application storage management method of claim 9, wherein the upload profile includes actions to take upon completion of the copying.

17. The cloud-hybrid application storage management method of claim 16, wherein the actions to take upon completion of the copying include at least one of the group of deleting an existing object in the destination archive database, deleting a source object in the repository, and transferring an additional file to the destination archive database.

18. The cloud-hybrid application storage management method of claim 9, wherein copying the instance of the digital asset to the archive database using the upload profile includes:
    requesting the transfer manager service and transfer layers to perform a copy of the instance of the digital asset from the repository to a cloud archive.

19. The cloud-hybrid application storage management method of claim 18, wherein the cloud archive is a public cloud storage resource.

20. The cloud-hybrid application storage management method of claim 9 further comprising:
    copying the instance of the media asset from the archive database into a working cache;

migrating the instance of the media asset in the archive database into a low-cost archive; and updating, with the manager agent, the location of the instance of the media asset in the central asset registry to provide an updated enterprise-wide view of the location of the instance of the media asset.

21. The cloud-hybrid application storage management method of claim 9, wherein the central asset registry includes the relationship registry and the rights registry, and the central asset registry updates the relationship registry and the rights registry upon updating the location of the instance of the media asset.

22. The cloud-hybrid application storage management method of claim 9, wherein the central asset registry is a graph database.

23. The cloud-hybrid application storage management method of claim 22, wherein the graph database includes graph objects corresponding to the rights information of the digital assets and a categorization of the graph objects representing a rights hierarchy of the digital assets.

24. The cloud-hybrid application storage management method of claim 23, wherein the graph database includes a property graph data model with nodes, relationships, properties, and labels in a rights hierarchy of the digital assets.

25. The cloud-hybrid application storage management method of claim 24, wherein the property data graph model includes inbound and outbound intellectual property rights.

26. The cloud-hybrid application storage management method of claim 25, wherein the archive database and the working cache are located in disparate geographic locations.

* * * * *

UNITED STATES PATENT AND TRADEMARK OFFICE
CERTIFICATE OF CORRECTION

PATENT NO. : 12,019,649 B2
APPLICATION NO. : 18/150433
DATED : June 25, 2024
INVENTOR(S) : Brant Boehmann et al.

Page 1 of 1

It is certified that error appears in the above-identified patent and that said Letters Patent is hereby corrected as shown below:

In the Claims

In Column 22, Line 18, delete "{-(P}to" and insert --to--

Signed and Sealed this
Seventh Day of January, 2025

Derrick Brent
*Acting Director of the United States Patent and Trademark Office*